United States Patent
Yamaashi et al.

(10) Patent No.: US 10,220,466 B2
(45) Date of Patent: Mar. 5, 2019

(54) SEAM WELDING METHOD AND SYSTEM

(71) Applicant: HONDA MOTOR CO., LTD., Tokyo (JP)

(72) Inventors: Kazuhiko Yamaashi, Tochigi (JP); Yasuhiro Kawai, Tochigi (JP); Mitsugu Kaneko, Tochigi (JP); Haruhiko Kobayashi, Tochigi (JP); Noriko Kurimoto, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 604 days.

(21) Appl. No.: 14/781,392

(22) PCT Filed: Apr. 16, 2014

(86) PCT No.: PCT/JP2014/060815
§ 371 (c)(1),
(2) Date: Sep. 30, 2015

(87) PCT Pub. No.: WO2014/175138
PCT Pub. Date: Oct. 30, 2014

(65) Prior Publication Data
US 2016/0045975 A1    Feb. 18, 2016

(30) Foreign Application Priority Data
Apr. 26, 2013  (JP) ................. 2013-093993

(51) Int. Cl.
*B23K 11/06* (2006.01)
*B23K 11/25* (2006.01)
(Continued)

(52) U.S. Cl.
CPC .............. *B23K 11/06* (2013.01); *B23K 11/08* (2013.01); *B23K 11/255* (2013.01); *B23K 11/3036* (2013.01)

(58) Field of Classification Search
CPC ....... B23K 11/06; B23K 11/061; B23K 11/08; B23K 11/251; B23K 11/252; B23K 11/255; B23K 11/3036
(Continued)

(56) References Cited

U.S. PATENT DOCUMENTS

| | | | |
|---|---|---|---|
| 2002/0134763 A1* | 9/2002 | Marek | B23K 11/241 219/108 |
| 2011/0233173 A1* | 9/2011 | Kaneko | B23K 11/002 219/83 |

FOREIGN PATENT DOCUMENTS

| | | |
|---|---|---|
| DE | 102009014766 A1 | 9/2010 |
| JP | 06-236205 | 8/1994 |

(Continued)

OTHER PUBLICATIONS

Adel Olabi, Mohamed Damak, Richard Bearee, Olivier Gibaru, Stephane Leleu. Improving the Accuracy of Industrial Robots by offline Compensation of Joints Errors. IEEE International Conference on Industrial Technology, Mar. 2012, Island of Kos, Greece. 2012.*

(Continued)

*Primary Examiner* — Dana Ross
*Assistant Examiner* — Brandon T Harvey
(74) *Attorney, Agent, or Firm* — Rankin, Hill & Clark LLP

(57) ABSTRACT

Shifts of a reference point C in a robot coordinate system among three postures of a seam welding apparatus 10 are found, and calibration data is obtained (STEP 1). Correction data is found from the calibration data based on deformation of elastic units 22*a* due to weight of the seam welding apparatus 10 in accordance with the posture of the seam (Continued)

welding apparatus 10 relative to a robot 20 (STEP 5). Teaching data is corrected based on the correction data (STEP 6).

6 Claims, 4 Drawing Sheets

(51) Int. Cl.
  B23K 11/08 (2006.01)
  B23K 11/30 (2006.01)
(58) Field of Classification Search
  USPC .......................................................... 219/83
  See application file for complete search history.

(56) References Cited

FOREIGN PATENT DOCUMENTS

| JP | 9-234566 A | 9/1997 |
|----|----|----|
| JP | 2002219581 A * | 8/2002 |
| JP | 2007-061834 | 3/2007 |
| JP | 2007-167896 A | 7/2007 |
| JP | 4653892 | 3/2011 |
| JP | 2011-240399 | 12/2011 |
| JP | 2013-081987 | 5/2013 |
| KR | 2011-0029826 | 3/2011 |

OTHER PUBLICATIONS

A Olabi, et al., "Improving the Accuracy of Industrial Robots by Offline Compensation of Joints Errors"; Industrial Technology (ICIT), 2012 IEEE International Conference ON, Jan. 17, 2013, pp. 492-497.
European Search Report dated Jan. 5, 2017, 7 pages.
International Search Report, PCT/JP2014/060815, dated Jul. 8, 2014, 2 pages.

* cited by examiner

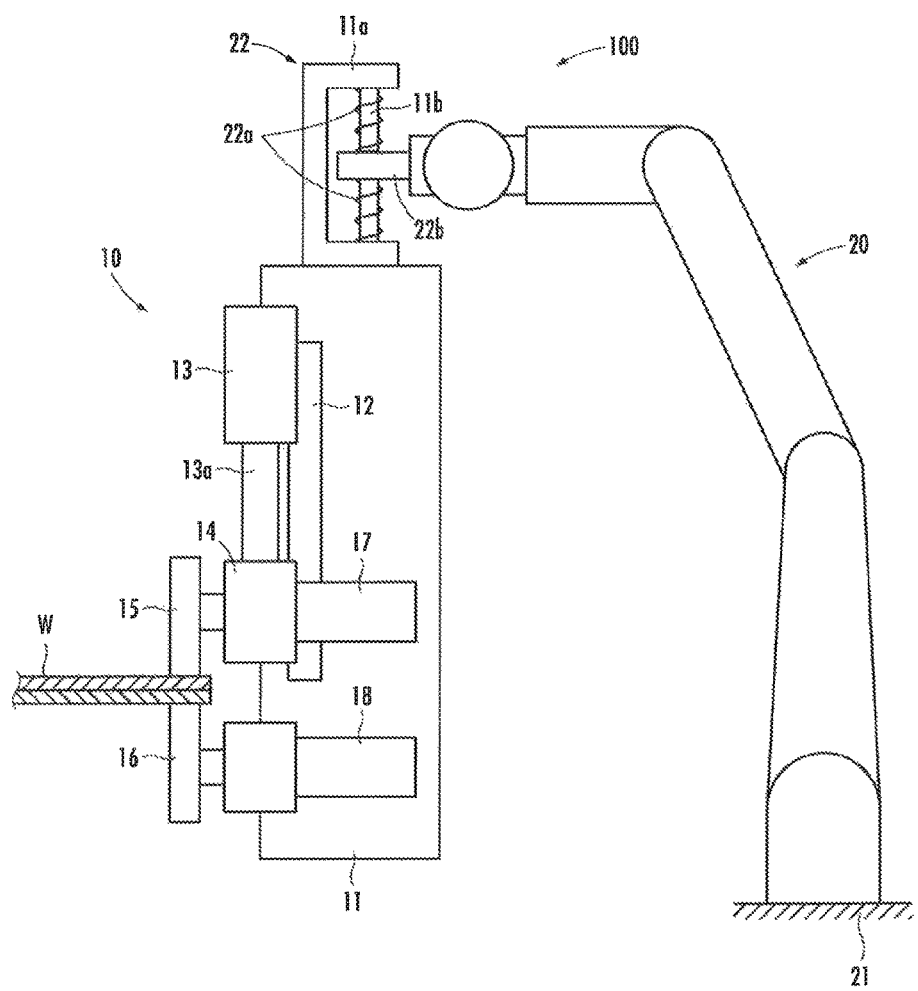

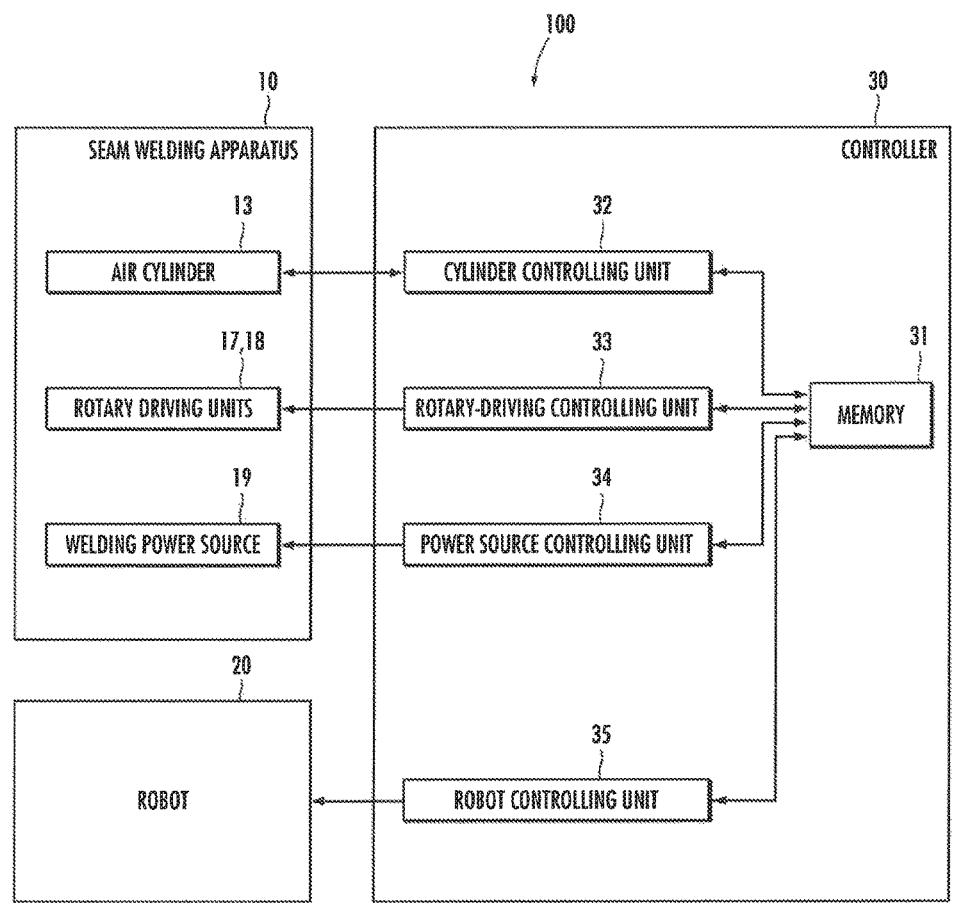

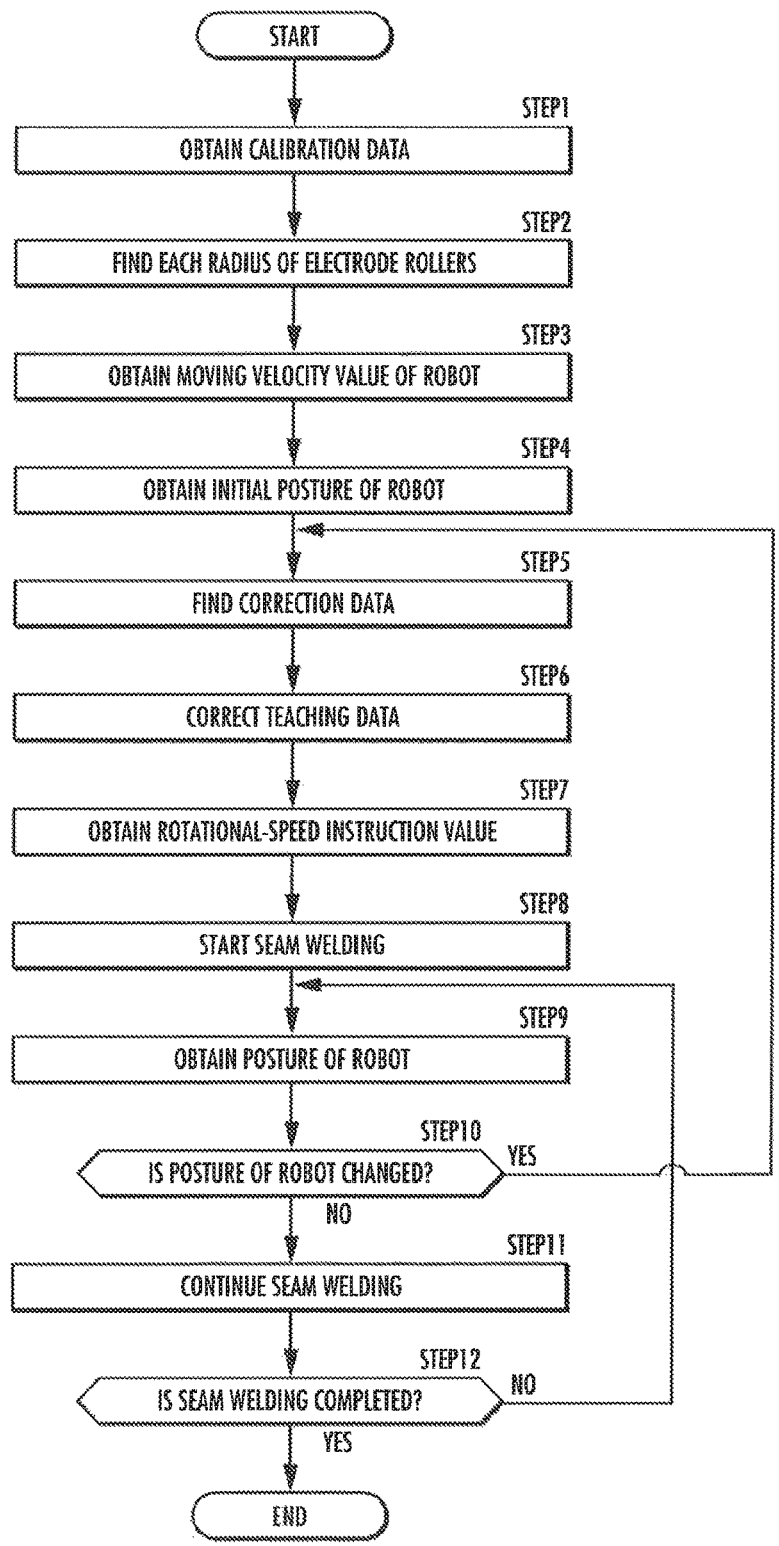

SEAM WELDING METHOD AND SYSTEM

TECHNICAL FIELD

The present invention relates to a seam welding method and a seam welding system.

BACKGROUND ART

Conventionally, there has been known a seam welding apparatus that holds welding targets (work pieces) between a pair of electrode rollers, and continuously welds the welding targets by rotating the electrode rollers while energizing the electrode rollers under pressure.

If the pressure onto the welding targets by the electrode rollers exceeds the allowable range, it will cause a bad influence on the work pieces, the electrode rollers, a robot that moves the seam welding apparatus, and the like. To cope with this, there is provided an equalizing mechanism having springs between the seam welding apparatus and the robot so as to bring the electrode rollers to follow the height of the work pieces (see Patent Literature 1, for example).

Accordingly, at the time of welding the work pieces, this mechanism prevents electrode chips from slipping on the work pieces, and excessive loads, such as bending forces and pressing forces, from being applied to the work pieces, or a shank and a pressurizing rod that support the electrode rollers from becoming bent. Therefore, the work pieces can be effectively protected, and welding operation can be preferably executed.

CITATION LIST

Patent Literature

Patent Literature 1
Japanese Patent No. 4653892

SUMMARY OF INVENTION

Technical Problem

However, predefining a moving path of a robot by a computer, which is so called off-line teaching, has recently come into use. In this off-line teaching, springs of an equalizing mechanism are supposed to be in a neutral state.

Actually, the springs of the equalizing mechanism come into a state different from its neutral state depending on the posture of the seam welding apparatus relative to the robot, so that an actual holding position (welding position) of the electrode rollers deviates from their expected holding position. In this case, discordance occurs between the moving velocity of the holding position by the robot and the rotational speed of the electrode rollers; therefore, if a portion to be seam-welded has a curved linear shape, the electrode rollers slip thereon, which might cause improper welding.

In view of the above, an object of the present invention is to provide a seam welding method and a seam welding system capable of preventing electrode rollers from slipping.

Solution to Problem

A seam welding method of the present invention moves a seam welding apparatus coupled to elastic units disposed at an end portion of a moving unit, the seam welding apparatus performing seam welding by energizing a pair of electrode rollers while holding plural welding targets between the electrode rollers, and the method includes a correcting step of correcting a moving path of the seam welding apparatus moved by the moving unit based on deformation of the elastic units due to weight of the seam welding apparatus in accordance with a posture of the seam welding apparatus relative to the moving unit.

According to the seam welding method of the present invention, the moving path of the seam welding apparatus moved by the moving unit is corrected based on the deformation of the elastic units due to the weight of the seam welding apparatus in accordance with the posture of the seam welding apparatus relative to the moving unit. Through this configuration, it is possible to consider the deformation of the elastic units in accordance with the posture of the seam welding apparatus relative to the moving unit so that the moving velocity of the seam welding apparatus by the moving unit as well as the moving velocity of the holding position of the electrode rollers can be brought to agree with expected values. Accordingly, it is possible to prevent discordance between the moving velocity of the holding position and the rotational speed of the electrode rollers, thereby preventing the electrode rollers from slipping even if a portion to be seam-welded has a curved linear shape, and thus no improper welding is caused.

For example, in the seam welding method of the present invention, the method may include: a first step of finding change in relative positional relation of the seam welding apparatus relative to the moving unit in a first posture of the seam welding apparatus relative to the moving unit; a second step of finding change in relative positional relation of the seam welding apparatus relative to the moving unit in a second posture different from the first posture of the seam welding apparatus relative to the moving unit; and a third step of finding change in relative positional relation of the seam welding apparatus relative to the moving unit in a third posture different from the first posture and the second posture of the seam welding apparatus relative to the moving unit, and in the correcting step, based on the change of the relative positional relations found respectively in the first step to the third step, the change in relative positional relation of the seam welding apparatus relative to the moving unit may be found in accordance with the posture of the seam welding apparatus relative to the moving unit.

A seam welding system of the present invention includes: a seam welding apparatus that performs seam welding by energizing a pair of electrode rollers while holding plural welding targets between the electrode rollers; a moving unit that moves the seam welding apparatus coupled to elastic units disposed at an end portion of the moving unit; and a correcting unit that corrects a moving path of the seam welding apparatus moved by the moving unit based on deformation of the elastic units due to weight of the seam welding apparatus in accordance with a posture of the seam welding apparatus relative to the moving unit.

According to the seam welding system of the present invention, the system includes the correcting unit that corrects the moving path of the seam welding apparatus moved by the moving unit based on the deformation of the elastic units due to the weight of the seam welding apparatus in accordance with the posture of the seam welding apparatus relative to the moving unit. Through this configuration, it is possible to consider the deformation of the elastic units in accordance with the posture of the seam welding apparatus relative to the moving unit so that the moving velocity of the seam welding apparatus by the moving unit as well as the moving velocity of the holding position of the electrode rollers can be brought to agree with expected values.

Accordingly, it is possible to prevent discordance between the moving velocity of the holding position and the rotational speed of the electrode rollers, thereby preventing the electrode rollers from slipping even if a portion to be seam-welded has a curved linear shape, and thus no improper welding is caused.

BRIEF DESCRIPTION OF DRAWINGS

FIG. 1 is a schematic diagram showing an overall configuration of a seam welding system according to an embodiment of the present invention.

FIG. 2 is a block diagram showing the overall configuration of the seam welding system.

FIG. 4 is a flow chart explaining a seam welding method according to the embodiment of the present invention.

DESCRIPTION OF EMBODIMENT

Figure 3A:
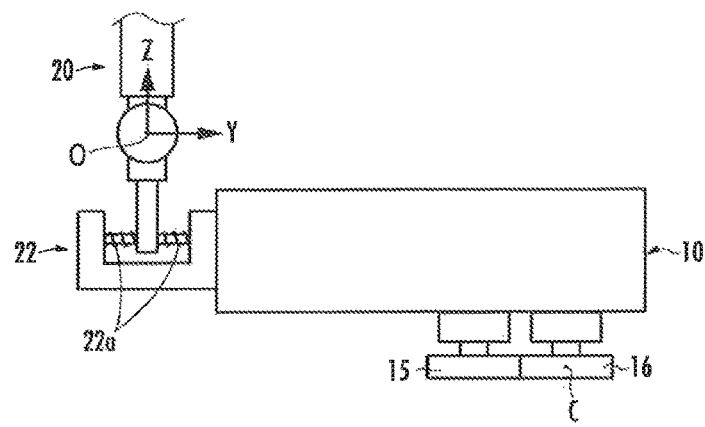
FIG. 3A to FIG. 3C are drawings showing shifts of a reference point due to difference in posture of a seam welding apparatus.

A seam welding system 100 according to an embodiment of the present invention will be described with reference to drawings. The seam welding system 100 is used for joining plural welding targets (work pieces) W formed of thin metal plates by a seam welding apparatus 10 so as to manufacture a window frame or a fuel tank of an automobile, and the like.

As shown in FIG. 1, the work pieces W are fixed at a predefined position with a not-shown work-piece fixing base, and is seam-welded by the seam welding apparatus 10 moved along a trajectory predefined by a robot 20. With reference to FIG. 2, the seam welding system 100 includes a controller 30 that controls the seam welding apparatus 10 and the robot 20, and the controller 30 is corresponding to a controlling unit of the present invention.

The robot 20 is an articulated robot whose plural arms are coupled through joints, such as a 6-axis robot, and is fixed on a base 21. Although not shown in the drawing, each joint of the robot 20 includes a driving unit such as a servo motor, and a detecting unit such as an encoder that detects an axial angle of the servo motor so as to perform a feedback control by the controller 30.

The robot 20 is equipped with an equalizing mechanism 22 at an arm end portion located at an end portion of the robot. The robot 20 moves the seam welding apparatus 10 via the equalizing mechanism 22, and corresponds to a moving unit. The equalizing mechanism 22 includes two elastic units 22a formed of springs and the like. The elastic units 22a are coil springs, for example.

The seam welding apparatus 10 includes a base stand 11 that is fixed to the robot 20 via the equalizing mechanism 22.

In this case, the equalizing mechanism 22 includes: a block 11a having a U-shaped side view, fixed on a top of the base stand 11; two bases 22b fixed to the arm end portion of the robot 20; and two beams 11b in a round-bar shape that are inserted into corresponding through holes formed in the respective bases 22b in such a manner that an upper end and a lower end of each beam 11b are respectively fixed to the block 11a. The two beams 11b are arranged in a depth direction of FIG. 1 (X-axis direction).

The elastic units 22a formed of two coil springs are so disposed in respective vertical spaces between the block 11a and the bases 22b as to surround outer circumferences of the beams 11b. Accordingly, the bases 22b are configured to be slidably movable relative to the beams 11b, and be urged by the elastic units 22a to return to their original positions. Hence, even with a slight variation in a part of the welding targets, it is possible to bring the seam welding apparatus 10 to follow this variation.

A vertically extending guide rail 12 is provided to the base stand 11. A movable stage 14 is provided to the guide rail 12 in a manner as to be vertically movable along the guide rail 12 by a driving unit 13. In this case, the driving unit 13 is an air cylinder 13, and the movable stage 14 is coupled to an end portion of a piston rod 13a of the air cylinder 13. The driving unit may also be an oil hydraulic cylinder, a rotary motor including a ball screw mechanism, or a linear motor.

An upper electrode 15 is axially supported by the movable stage 14, and a lower electrode 16 is axially supported by the base stand 11. Through this configuration, the lower electrode 16 is disposed at a predetermined height, and the upper electrode 15 is disposed to be movable in the vertical direction relative to the lower electrode 16. The upper electrode 15 and the lower electrode 16 are disk-like electrodes, and are also collectively referred to as electrode rollers 15, 16.

Rotary driving units 17, 18 are respectively connected to the electrode rollers 15, 16 so as to rotate the respective electrode rollers 15, 16 in a predefined rotational direction at a specified rotational speed. In this case, the rotary driving units 17, 18 are servo motors, and may also be pulse motors or common motors including rotary encoders.

The upper electrode 15 is connected to a welding power source 19 that supplies current necessary for the welding (welding current), and which corresponds to a welding current supply unit of the present invention. In this case, the welding power source 19 supplies a direct pulse current, but may also supply an alternating current.

With this configuration, the piston rod 13a of the air cylinder 13 is extended to move down the upper electrode 15 in a state of holding the work pieces W between the electrode rollers 15, 16, and in this state, the welding current is supplied from the welding power source 19 to the upper electrode 15. In this manner, the welding current flows from the upper electrode 15 through the work pieces W held between both the electrode rollers 15, 16 to the lower electrode 16 (earth electrode), thereby carrying out the seam welding.

As described above, the air cylinder 13 pressurizes the upper electrode 15 toward the lower electrode 16 in a manner as to pressurize the work pieces W held between the electrode rollers 15, 16.

As shown in FIG. 2, the controller 30 is an electronic circuit unit including a not-shown CPU and others. By executing control programs stored on a memory 31 by the CPU, the controller 30 functions as a cylinder controlling unit 32 that controls the air cylinder 13, a rotary-driving controlling unit 33 that controls the rotary driving units 17, 18, a welding power source controlling unit 34 that controls the welding power source 19, and a robot controlling unit 35 that controls the robot 20, thereby controlling the operations of the seam welding apparatus 10 and the robot 20.

The memory 31 stores teaching data instructing a moving path of the seam welding apparatus 10 by the robot 20, and welding control data based on the welding conditions, such as amount of movement of the piston rod 13a of the air cylinder 13, a rotational speed of the rotary driving units 17, 18, and a welding current value to be supplied from the welding power source 19. The memory 31 also stores a correction program to find correction data to be used for correcting the teaching data based on the posture of the seam welding apparatus 10 relative to the robot 20. Specifically, the CPU executes the correction program to cause the controller 30 to function as a correcting unit.

The controller 30 reads out the welding control data stored on the memory 31 and generates a control signal based on the welding conditions, and sends the generated control signal to the air cylinder 13, the rotary driving units 17, 18, the welding power source 19, and the robot 20, respectively.

The seam welding apparatus 10 is connected via the elastic units 22a of the equalizing mechanism 22 to the robot 20. Hence, in accordance with the posture of the seam welding apparatus 10 relative to the arm end portion of the robot 20, amount of expansion and contraction of the elastic units 22a varies due to weight of the seam welding apparatus 10, so that the relative positions of the elastic units 22a vary. Specifically, the positions of the elastic units 22a might vary from its neutral state due to the weight of the seam welding apparatus 10 regardless of change in height between the electrode rollers 15, 16 and the work pieces W in some cases.

Figure 3B:
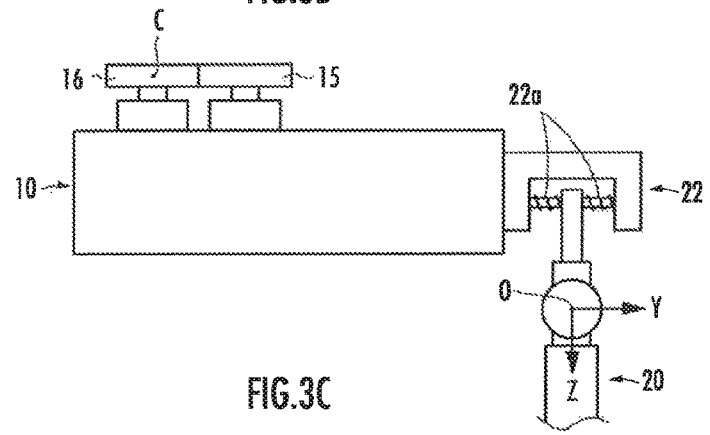
Figure 3C:
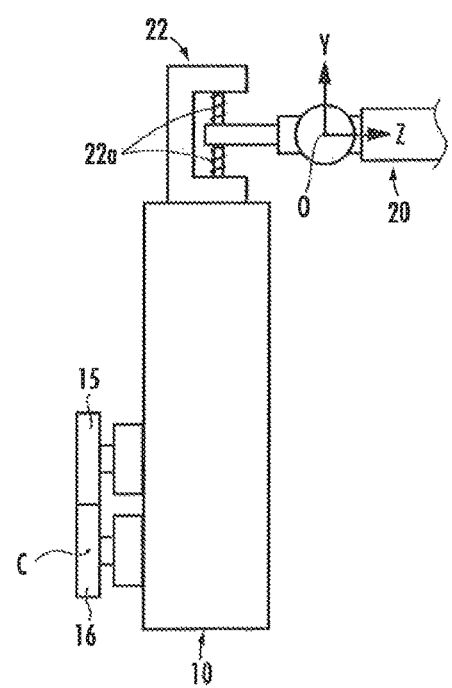

For example, as shown in FIG. 3A to FIG. 3C, in the neutral state in which the amount of expansion and contraction of the elastic units 22a is "0", a reference point O is defined at a particular point at the arm end portion of the robot 20, and a coordinate system having the reference point O as an origin thereof is fixedly set to the arm end portion of the robot 20. Hereinafter, this coordinate system is referred to as a robot coordinate system. A reference point C (e.g., central point of the lower electrode 16) is also set to the seam welding apparatus 10.

As shown in FIG. 3A, if the seam welding apparatus 10 is located vertically downward of the arm end portion of the robot 20, specifically, if the seam welding apparatus 10 is in a downward posture, the elastic unit 22a located in the Y-axis positive direction expands, and the elastic unit 22a located in the Y-axis negative direction contracts due to the weight of the seam welding apparatus 10. Consequently, the reference point C of the seam welding apparatus 10 in the robot coordinate system shifts in the Y-axis positive direction from its neutral state.

As shown in FIG. 3B, if the seam welding apparatus 10 is located vertically upward of the arm end portion of the robot 20, specifically, if the seam welding apparatus 10 is in an upward posture, the elastic unit 22a located in the Y-axis positive direction expands, and the elastic unit 22a located in the Y-axis negative direction contracts due to the weight of the seam welding apparatus 10. Consequently, the reference point C of the seam welding apparatus 10 in the robot coordinate system shifts in the Y-axis negative direction from its neutral state.

As shown in FIG. 3C, if the seam welding apparatus 10 is located in the horizontal direction to the arm end portion of the robot 20, specifically, if the seam welding apparatus 10 is in a horizontal posture, the elastic unit 22a located in the Y-axis positive direction contracts, and the elastic unit 22a located in the Y-axis negative direction expands due to the weight of the seam welding apparatus 10. Consequently, the reference point C of the seam welding apparatus 10 in the robot coordinate system shifts in the Y-axis negative direction from its neutral state.

As described above, the reference point C in the robot coordinate system shifts in accordance with the posture of the seam welding apparatus 10 relative to the robot 20. The amount of movement and the moving direction can be found based on the shifts of the reference point C in the robot coordinate system among the aforementioned three postures of the seam welding apparatus 10.

A seam welding method according to the embodiment of the present invention using the aforementioned seam welding system 100 will be described with reference to drawings.

As shown in a flow chart in FIG. 4, the shifts of the reference point C in the robot coordinate system among the three postures of the seam welding apparatus 10 are found, and calibration (correction) is carried out so as to obtain calibration data (STEP 1).

Subsequently, each radius of the electrode rollers 15, 16 is found (STEP 2). Specifically, in this step, a total radius Rt of the electrode rollers 15, 16 is found based on amount of stroke of the piston rod 13a of the air cylinder 13 at the time of extending the piston rod 13a to bring the upper electrode 15 downward to abut to the lower electrode 16, or based on a relative distance in the vertical direction between the base stand 11 and the movable stage 14.

A moving velocity value of the electrode rollers 15, 16 relative to the work pieces W, that is, of the arm end portion of the robot 20 is obtained (STEP 3). The moving velocity value is stored on the memory 31 as the welding control data.

An initial posture of the robot 20 is obtained (STEP 4). This posture includes a posture of the arm end portion of the robot 20. The initial posture of the robot 20 is stored on the memory 31 as the teaching data.

Based on the initial posture of the arm end portion of the robot 20 obtained in STEP 4, correction data is found based on the calibration data obtained in STEP 1 (STEP 5).

Based on the correction data obtained in STEP 5, the teaching data is corrected (STEP 6).

Based on each radius of the electrode rollers 15, 16 obtained in STEP 2, the moving velocity value of the aim end portion of the robot 20 obtained in STEP 3, and the teaching data corrected in STEP 6, each rotational-speed instruction value of the electrode rollers 15, 16 is obtained (STEP 7). This is because a contact length to each work piece W per unit time varies if the radii of the electrode rollers 15, 16 vary although the electrode rollers 15, 16 have the same rotational speed.

The seam welding onto the work pieces W is started (STEP 8).

During the welding, the posture of the robot 20 is obtained (STEP 9), and if the posture of the robot is changed (STEP 10: YES), the task returns to STEP 5.

Until the seam welding is completed (STEP 12: YES), the seam welding onto the work pieces W is continued (STEP 11). The posture of the robot 20 is stored on the memory 31 as the teaching data.

As described above, in the present embodiment, the teaching data is corrected based on the deformation of the elastic units 22a due to the weight of the seam welding apparatus 10 in accordance with the posture of the seam welding apparatus 10 relative to the arm end portion of the robot 20 (STEP 5). Accordingly, the holding position (welding position) of the electrode rollers 15, 16 is prevented from deviating from the expected position.

Accordingly, it is possible to prevent discordance between the moving velocity of the holding position by the robot 20 and the rotational speed of the electrode rollers 15, 16, thereby preventing the electrode rollers 15, 16 from slipping even if a portion to be seam-welded has a curved shape, and thus no improper welding is caused.

As described above, the embodiment of the present invention has been explained, but the present invention is not limited to this. For example, it has been exemplified that the upper electrode 15 is vertically movable and the lower electrode 16 is fixed. However, the present invention is not limited to this, and it may be configured so that the upper electrode 15 is fixed and the lower electrode 16 is vertically movable, or the upper electrode 15 and the lower electrode 16 are both vertically movable.

It has been exemplified that the upper electrode 15 and the lower electrode 16 are arranged in the vertical direction. However, the present invention is not limited to this, and the upper electrode 15 and the lower electrode 16 may be arranged in the horizontal direction, or may be arranged to be inclined to each other.

REFERENCE SIGNS LIST

10 . . . seam welding apparatus, 11 . . . base stand, 11a . . . block, 11b . . . beam, 12 . . . guide rail, 13 . . . driving unit, air cylinder, 13a . . . piston rod, 14 . . . movable stage, 15 . . . upper electrode (electrode roller), 16 . . . lower electrode (electrode roller), 17, 18 . . . rotary driving unit, 19 . . . welding power source, 20 . . . robot, 21 . . . base, 22 . . . equalizing mechanism, 22a . . . elastic unit, 22b . . . base, 30 . . . controller (correcting unit), 31 . . . memory, 32 . . . cylinder controlling unit, 33 . . . rotary-driving controlling unit, 34 . . . power source controlling unit, 35 . . . robot controlling unit, 100 . . . seam welding system, W . . . work piece (welding target).

The invention claimed is:

1. A seam welding method of moving a seam welding apparatus coupled to elastic units disposed at an end portion of a moving unit, the seam welding apparatus performing seam welding by energizing a pair of electrode rollers while holding plural welding targets between the electrode rollers, the method comprising:
    a calibration data obtaining step of obtaining calibration data by:
        a first step of obtaining data related to change in relative positional relation of the seam welding apparatus relative to the moving unit in a first posture of the seam welding apparatus relative to the moving unit;
        a second step of obtaining data related to change in relative positional relation of the seam welding apparatus relative to the moving unit in a second posture different from the first posture of the seam welding apparatus relative to the moving unit; and
        a third step of obtaining data related to change in relative positional relation of the seam welding apparatus relative to the moving unit in a third posture different from the first posture and the second posture of the seam welding apparatus relative to the moving unit; and
    a correcting step of correcting a moving path of the seam welding apparatus moved by the moving unit based on the calibration data and deformation of the elastic units due to weight of the seam welding apparatus in accordance with a posture of the seam welding apparatus relative to the moving unit.

2. The seam welding method according to claim 1, wherein the seam welding apparatus is coupled to an end portion of the moving unit via an equalizing mechanism, the equalizing mechanism including two elastic units.

3. The seam welding method according to claim 2, wherein the data related to change in relative positional relation of the seam welding apparatus relative to the moving unit in the first posture, the second posture, and the third posture is a contraction and expansion of the two elastic units.

4. A seam welding system comprising:
    a seam welding apparatus that performs seam welding by energizing a pair of electrode rollers in a state of holding plural welding targets between the electrode rollers;
    a moving unit that moves the seam welding apparatus coupled to elastic units disposed at an end portion of the moving unit; and
    a correcting unit that corrects a moving path of the seam welding apparatus moved by the moving unit based on calibration data and deformation of the elastic units due to weight of the seam welding apparatus in accordance with a posture of the seam welding apparatus relative to the moving unit,
    wherein the calibration data is obtained by:
        obtaining data related to change in relative positional relation of the seam welding apparatus relative to the moving unit in a first posture of the seam welding apparatus relative to the moving unit;
        obtaining data related to change in relative positional relation of the seam welding apparatus relative to the moving unit in a second posture different from the first posture of the seam welding apparatus relative to the moving unit; and
        obtaining data related to change in relative positional relation of the seam welding apparatus relative to the moving unit in a third posture different from the first posture and the second posture of the seam welding apparatus relative to the moving unit.

5. The seam welding system according to claim 4, wherein the seam welding apparatus is coupled to an end portion of the moving unit via an equalizing mechanism, the equalizing mechanism including two elastic units.

6. The seam welding system according to claim 5, wherein the data related to change in relative positional relation of the seam welding apparatus relative to the moving unit in the first posture, the second posture, and the third posture is a contraction and expansion of the two elastic units.

* * * * *